Aug. 2, 1927.

J. M. STEWART 1,637,429

GLARELESS LAMP

Filed Sept. 9, 1926

J. M. Stewart
inventor

By: Parker & Clark
Attys.

Patented Aug. 2, 1927.

1,637,429

UNITED STATES PATENT OFFICE.

JAMES MILNE STEWART, OF BRISBANE, QUEENSLAND, AUSTRALIA.

GLARELESS LAMP.

Application filed September 9, 1926, Serial No. 134,548, and in Australia October 2, 1925.

This invention relates to light projector lamps in which the lamp or light source is located about the focal point within a hollow reflector, and it consists in an improved means for diminishing glare effect with the object of improving the utility of such devices, particularly as motor head lamps.

The invention consists in a lamp having only one light source and fitted with two forwardly directed concave projector reflectors having a lenticular cell between them. The frontal reflector is perforated and polished and the rearward reflector is also polished bright. The face of the rearward reflector may be tinted. In practice, the light source is an electric lamp, and its envelope or globe is preferably tinted blue-green or other color in the higher range of the spectrum, and the back of the frontal reflector is tinted in a color in the lower range of the spectrum, as for instance golden-yellow or orange. The best repression of glare is obtained when the colors of the respective light beams are complementary or nearly so. The preferred combination is provided with a blue-green light, two matt surfaced polished silver reflectors, and an orange-red color finish on the polished back of the front reflector. Less satisfactory results are obtained when a clear (untinted) light is used instead of a blue-green light. Less satisfactory results are also obtained if the face of the back reflector is tinted, and it has been found that if the back reflector has a polished copper face undesirable results are obtained though a light brass finish produces acceptable results.

In a lamp thus constructed, rays or shafts of clear or tinted light pass backward from the light source through the perforations in the forward reflector and suffer reflection forwardly at the surface of the rear reflector, the lenticular space between the two reflectors being filled with light.

The light projected by a lamp thus constructed does not cast harsh shadows and consequently does not accentuate road surface inequalities to the same extent as a beam from an ordinary silvered reflector, and whilst the beam obtained is not so "piercing" as a beam obtainable from a silvered reflector, it offers more effective illumination of the whole road surface forward of a car and does not involve discomfort to the eyes of a driver coming in the opposite direction on the road.

In the accompanying drawing:—

A is the lamp casing, B a hollow silver surface reflector, C holes symmetrically punched or drilled through the reflector B, E an electric glow lamp, D a face glass or lens covering the front of the lamp case, and F an adaptor socket through which a connection is made to a battery or other source of electric current for operating the lamp. G is a lenticular cell formed by the space contained within the perforated reflector B and a back reflector H which is fixed within the case A in the same axial direction as the reflector B.

The envelope of the electric lamp E is usually constructed of blue-green glass or glass of another color which tints the direct forward rays from the filament so that the glare effect of those rays on the eyes of an observer located in front of the lamp is softened. A light blue tinting, commonly known as "daylight" tinting, is preferable. Light is projected directly forward from the end of the lamp envelope E but the lateral rays which are directed towards the reflector surface B are either reflected from that surface or pass through the holes C into the lenticular cell G. Those that strike the surface B are reflected forwardly in a more or less compact beam, the degree of divergence of which is regulated by adjusting the position of the lamp socket to focus the luminous portion of the filament near the focal point of the reflector. The rays which pass through the perforations C into the lenticular cell G strike the surface of the rearward reflector H and are projected forwardly by it so that they stream out again through the perforations C in many directions, some of them at a considerable angle from the directrix, so producing a spread or dispersed effect in the illumination produced by the lamp on a road or on objects in their path.

The line M indicates a colored and polished film or surface on the back of the forward reflector and the line N represents a polished or tinted concave face on the rear reflector H.

Figure 2:
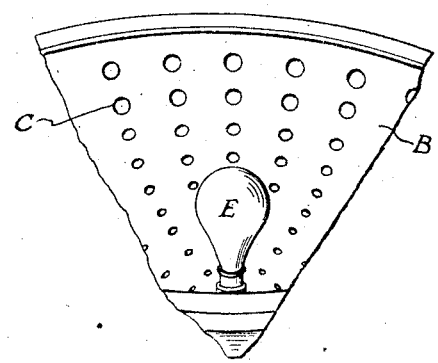
Fig. 2 is a broken perspective front view of a portion of the lamp to indicate the preferable manner in which frontal reflector B is perforated.
Figure 1:
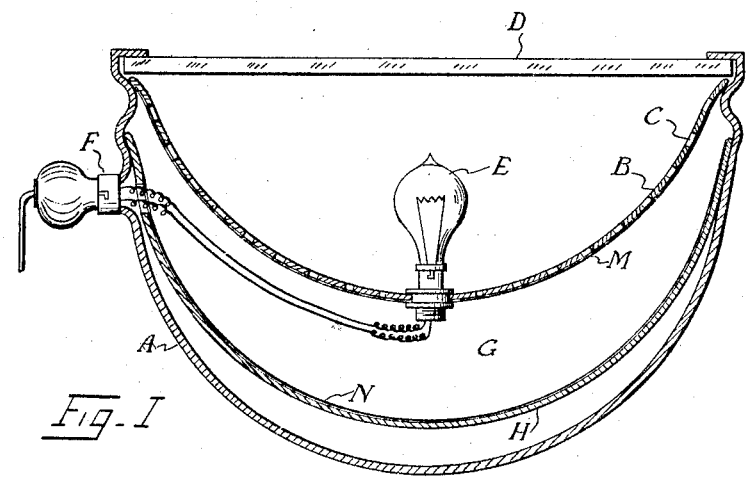
Fig. 1 is a vertical section through a projector lamp such as would be suitable for a motor car head light. Structural adaptation of this lamp for interior illumination and other purposes may be readily schemed within the range of the invention by any practical lamp manufacturer.

The size and arrangement of the perforations in the frontal reflector may be varied. The most convenient and elegant arrangement is the radial arrangement indicated in Fig. 2. It would seem to be desirable that 10% or more of the surface area of the forward reflector should be occupied by the system of symmetric perforations. The front reflector surface is polished, preferably with matt finish, which procures better results than sheen finish.

The reason why glare is so substantially reduced in this lamp is not fully explained on present knowledge. The eye is not paralyzed or seriously discomforted by gazing for a little time directly at the lamp, whereas with a light source of the same value used with an ordinary silvered reflector the vision of the observer would be entirely paralyzed for several moments if he were to gaze at such a lamp, as is well understood by motorists.

What I claim as my invention and desire to secure by Letters Patent is:—

1. A lamp having a focalizing light projecting reflector, a light source in the focal zone of the reflector, said reflector being provided with symmetrically disposed perforations, a lenticular cell rearward of said reflector having a concave reflector forming its rearward wall, said cell having a surface colored differentially in relation to the color of the light emitted from the lamp.

2. A glareless lamp having two reflectors in tandem and spaced apart, the forward one symmetrically perforated and fitted with a lamp socket adapted to hold a lamp in its focal zone, a tinted surface on the back of the forward reflector, and polished frontal faces on both reflectors.

3. A glareless lamp having two reflectors in tandem and spaced apart, the forward one symmetrically perforated and fitted with a lamp in its focal zone, and a tinted surface on the back reflector differentially colored in relation to the color of the lamp envelope.

In testimony whereof I affix my signature.

JAMES MILNE STEWART.